(12) United States Patent
Royer

(10) Patent No.: US 6,195,452 B1
(45) Date of Patent: Feb. 27, 2001

(54) METHOD OF AUTHENTICATING NEGOTIABLE INSTRUMENTS

(76) Inventor: George R. Royer, 2137 Ragan Woods Dr., Toledo, OH (US) 43614

(*) Notice: Subject to any disclaimer, the term of this patent is extended or adjusted under 35 U.S.C. 154(b) by 0 days.

(21) Appl. No.: 09/066,829

(22) Filed: Apr. 27, 1998

(51) Int. Cl.⁷ .................................................. G06K 9/00
(52) U.S. Cl. ............................................ 382/135; 382/137
(58) Field of Search .................................. 382/115, 137, 382/317; 283/72, 74, 75, 58, 70, 92

(56) References Cited

U.S. PATENT DOCUMENTS

| | | | |
|---|---|---|---|
| 3,985,998 | * 10/1976 | Crafton | 235/380 |
| 4,588,211 | * 5/1986 | Greene | 283/70 |
| 4,667,985 | * 5/1987 | Leonard et al. | 283/58 |
| 4,988,126 | * 1/1991 | Heckenkamp et al. | 283/92 |
| 5,433,483 | * 7/1995 | Yu | 283/58 |
| 5,838,814 | * 11/1999 | Moore | 382/115 |

* cited by examiner

*Primary Examiner*—Andrew W. Johns
*Assistant Examiner*—Shervin Nakhjavan

(57) ABSTRACT

The subject invention is a process for improving the process of authenticating a negotiable instrument such as checks, comprising the usage of a series of coded designated portions on the face of the check, which portions can be marked in part according to a predetermined code so as to supplement a signature on the instrument for authenticity. Other code means may be employed on the negotiable instrument to create a physical and related mean employed by the issuer of the check to differentially code the instrument when it is initially negotiated as an additional authentication means, with one general embodiment of the invention comprising a computerized apparatus that can detect the right coding when the instrument is presented for cashing or payment of an obligation, such invention comprising in part, in an alternative embodiment, computer programmatic algorithmic means to authenticate the process of making and uttering such negotiable instrument.

3 Claims, 2 Drawing Sheets

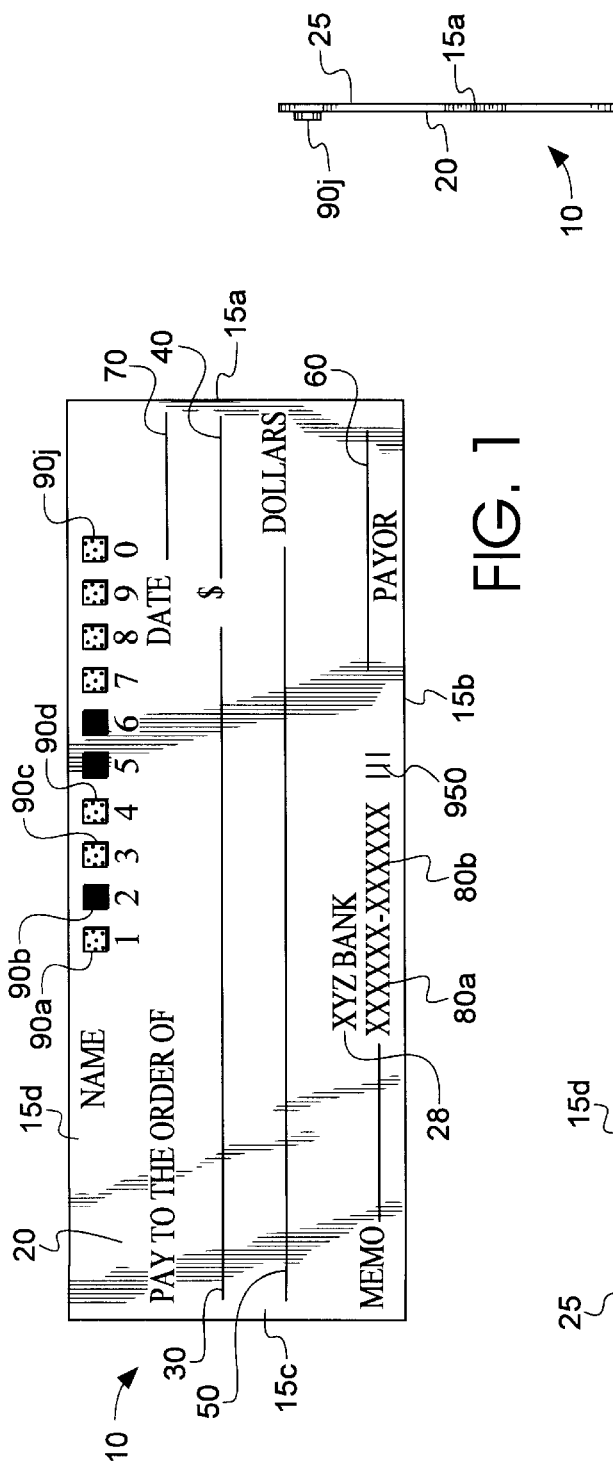
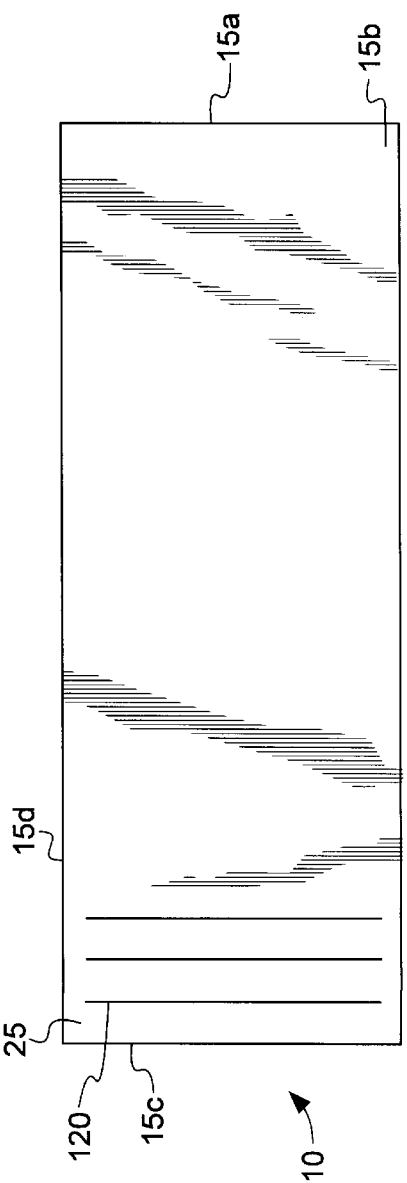

METHOD OF AUTHENTICATING NEGOTIABLE INSTRUMENTS

DISCUSSION OF PRIOR ART AND BACKGROUND OF INVENTION

This patent application is a continuation in part of my provisional patent application entitled "METHOD OF AUTHENTICATING NEGOTIABLE INSTRUMENTS". The subject invention relates to the process of authenticating negotiable instruments in order to detect potential forgery of check, as in the case of the parent application of this patent application. In this latter respect, the issuance, execution, and negotiation of negotiable instruments is frequently susceptible to fraud. One of the prevalent types of fraud is forgery of the signature on a negotiable instrument with the resultant losses to individuals, merchants or other parties.

One has limited abilities to detect the forgery of a negotiable instrument, and additional means are needed to improve the validation of signatures and other negotiation processes when a negotiable instrument is presented. This need for authentication is important to the merchant or individual who accepts a check or negotiable instrument, just as much as it is important to the bank or the institution on which it is drawn.

The conventional and existing procedures used for financial institutions for detecting a false or forged signature on a negotiable instrument is by visual inspection of the signature on the instrument. This is accomplished in a banking institution, for example, when the check is processed by a visual scanning to ascertain its authenticity. This latter process is time consuming and not fully effective, and while there is some electronic scanning of signatures in this regard, there is not sufficient means available to accurately detect the accuracy of the signature, and this relative inefficiency of existing authentication processes results in higher check processing costs to banks and the public at large. It also results in a significant number of forged instruments being undetected, since the authenticity of a handwritten signature is not fully detectible to an electronic scanner.

As stated, there are some automated processes for improving the detection of forgery on checks and similar negotiable instruments, however, none have proven to be highly effective and efficient. Consequently, the subdect invention is conceived as a method and process to improve on and supplement such authentication procedures, and the following objects of the subject invention are directed accordingly.

OBJECTS

It is an object of the subject invention to provide an improved device and process to provide an improved method for detecting the authenticity of negotiable instruments;

An additional object of the subject invention is to provide an improved device, coupled with a programmatic method of authenticating a signature on a negotiable instrument;

Another object of the subject invention is to provide an improved detection method for ascertaining forgery on a written instrument;

Another object of the subject invention is to provide an improved process and method for detecting forged and unauthorized signatures on a documents;

Still another object of the subject invention is to provide a supplementary process for detecting an unauthorized issuance of a document;

A further object of the subject invention is to provide a means to detect the authenticity of a check when it is instantly presented;

Yet another object of the subject invention is to provide a coded mechanism for improving the authenticity of negotiable instruments;

A further object of the subject invention is to provide a device for a person to authenticate a negotiable instrument when presented;

Other and further objects of the subject invention will become apparent on a reading of the specification in conjunction with the claims and drawings.

DRAWINGS

FIG. 1 is a frontal elevational view of the subject invention;

FIG. 2 is a back elevational view of the subject invention;

FIG. 3 is a side elevational view of the subject invention;

DESCRIPTION OF GENERAL EMBODIMENT

Figure 4:
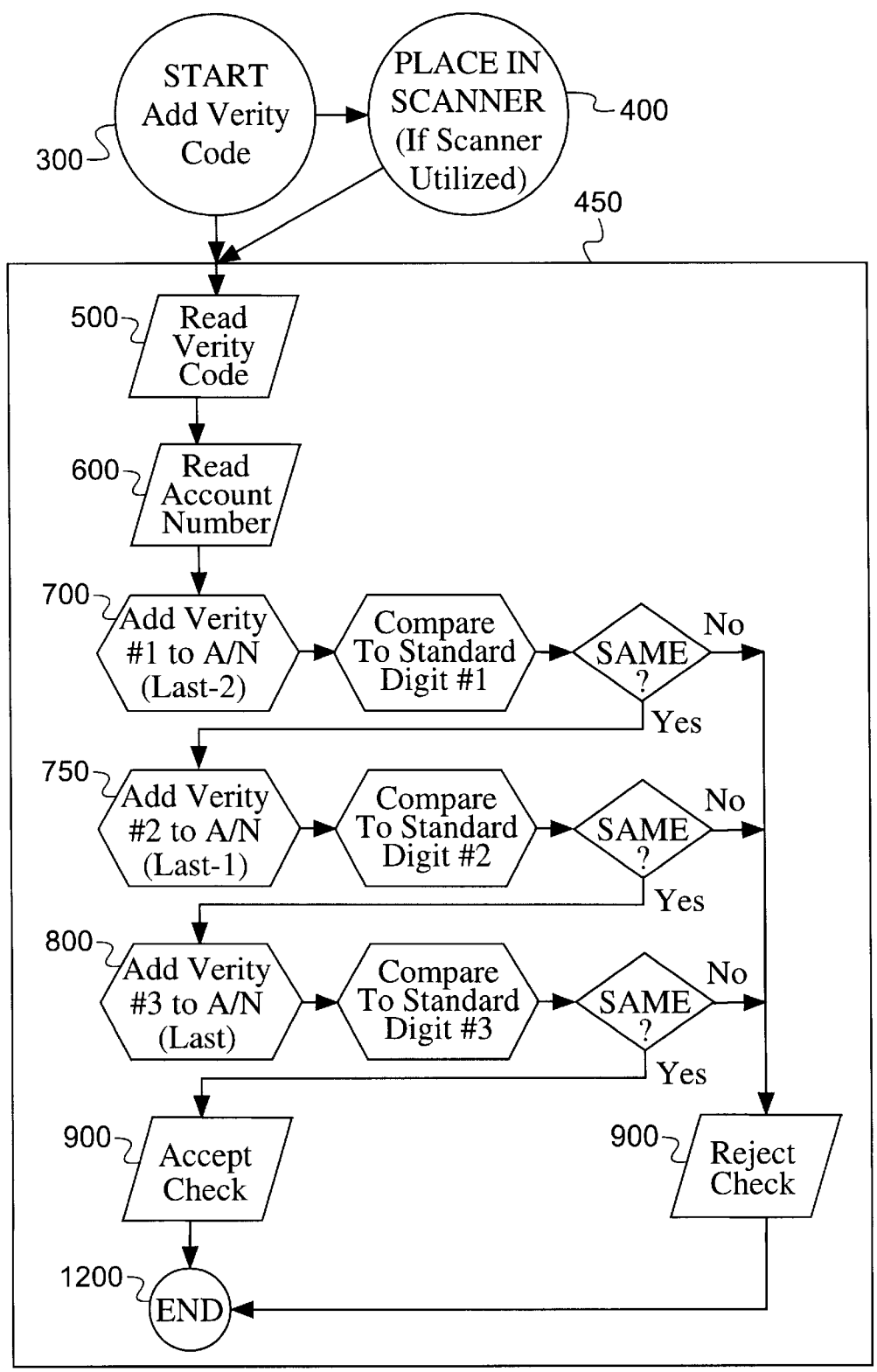
FIG. 4 is a schematic diagram of the subject invention incorporating the subject invention.

The subject invention is a process for improving the process of authenticating a negotiable instrument such as checks, comprising the usage of a series of alphanumeric coded and/or numerically designated portions on the face of the check, which portions can be marked in part according to a predetermined code so as to supplement a signature on the instrument for authenticity purposes. Other code means may be employed on the check to create a physical and related mean employed by the issuer of the check to differentially code the check as additional authentication means, with one embodiment of the invention comprising a computerized register that can detect the proper coding when the check is presented for cashing or payment cf an obligation.

Alternatively described, in the general embodiment of the subject invention, is based on a system employed to authenticate the execution of a negotiable instrument, such as a bank check, and comprises in one embodiment the following hardware and software elements:

(a) a negotiable instrument having on a portion of its surface means for the maker of the instrument to mark or otherwise indicate a coded sequence of numbers, letters or other symbols either in or by invisible or visible marking in order to code the instrument for eventual authentication, and means to correlate said encoded inscription with existing inscriptive data or other matters previously set forth in the negotiable instrument;

(b) independent computer hardware, such as a register, having a computer software program that functions to determine if there is or is not a proper correlation between the coded data inscribed by the issuer of the instrument and the data previously inscribed or placed on the instrument;

(c) computer programming, software providing algorithmic means to correlate the relations, if any, between the coded, confidential data inscribed on the negotiable instrument (by the maker or issuer of the instrument) and the previously printed or inscribed data on the instrument.

Additional features are incorporated in the scope of the subject invention to include means to authenticate through direct visual, scanning or computer oriented algorithmic means to determine the authenticity of the making, uttering or cashing of the particular negotiable instrument.

DESCRIPTION OF PREFERRED EMBODIMENT

In the following description of the subject invention, it is to be stressed that the embodiments described herein are only a few of the embodiments that are within the scope of the subject invention, and therefore such description of a few limited embodiments shall not be considered as limiting the scope of the claims annexed hereto. Moreover, it is to be stressed that the following description of the invention's application to a check shall not be construed as limiting the scope of the invention solely to a check, as the scope of the subject instrument may be equally applicable to any type of negotiable or written instrument that requires some form of authentication.

Referring now to the drawings, in which a preferred embodiment of the subject invention is shown, a negotiable instrument in the form of a check 10 is shown. This check 10 is usually a paper-based instrument that has a front face 20 and a back face 25. It is stressed, as stated above, that the subject invention is not limited to a check or similar negotiable instrument but may be equally applied to any document that needs to be verified.

As can be seen and is well known, the front face of the check 10 is adapted to receive, in the usual practice, printed material on such face. This printed material on the check's front face 20 sets forth the written attributes of the check 10, as in the case of any written negotiable instrument, such as the name 28 of the financial institution on which the check is drawn. The blank space 30 is utilized for placing the name of the designated payee and spaces 40 and 50 on such front face 20 are adapted to have the amount of the check placed thereon. Space 70 on front face 20, is for the date placement and blank space 60 is set forth for the signature of the maker. Additionally, printed numbers or symbols 80A on check front face 20 identify, among other things, the clearing codes for the institution on which the check is drawn. Additionally, placed on the front face 20 of check 10 are the account numbers 80B of the issuer or maker of the check 10, all usually placed on the check front face 20 along with sequenced check numbers, not shown, among other matters. These features are delineated in FIG. 1 of the drawings showing the typical front face of a check, and are considered standard on a bank draft or check, although some additional written embellishments may be placed on the front face 20 of the check 10. On the back surface 25 of such check 10, there is usually no written material placed on such surface in order to leave room for endorsements on spaces 120. Although in some cases some written material may be placed on the back surface 25 of the check 10 for restricting conditions of negotiation. As can be seen from the drawings, the front face of the check is rectangular in configuration, as viewed frontally, with side edges 15A and 15C and top and bottom edges 15D and 15B, respectively. These respective edges define the limits of the front face 20 of check 10.

As stated, it is usual practice that the negotiable instrument in the form of check 10 be provided, as stated above, with appropriately embossed clearing numbers 80A or account numbers 80B that can be electronically scanned in some manner. For this purpose, these clearing account numbers, etc. may be embossed or printed with magnetically composed ink or ink with some similar qualities that permit magnetic scanning. This scanning process is used primarily to post checks and determine check routing features among other process matters, and is particularly helpful to the authentication process.

Generally, as poreviously discussed, to ascertain the authenticity of the utterance or making of a check, a signature is usually checked by the human eyes. This latter visually, oriented process is generally accomplished by personnel of the financial institution on which the check 10 is drawn, although the partly to whom the check is initially issued frequently may also make a comparative inspection of the signature or independent documentation for authentication purposes. Some machines have been perfected to electronically scan a signature, although some scanner devices are not very accurate because of the variations of an individual's signature from time to time. By reason of this latter aspect, the following describes a supplementary process using attendant coding features emplaced to the front face 20 of the check 10, although such coding features could be affixed to the back surface 20 or other areas of said check 10 to accomplish such purposes.

In the preferred embodiment of the subject invention, the front face of check 10 is provided with a series of segmented separated members 90A, 90B, 90C, 90D . . . 90J in the form of demarcated spaces that are adapted to be marked for coding purposes. For this purpose, each segmented member can be chemically treated, or embossed with magnetic ink, or other substances capable of receiving a mark that chemically or otherwise distinguishes or physically sets off the segmented members from the remainder of the front face, to be marked for coding and scanning purposes. This alteration or demarcation of the segments may result in either visible or invisible indications. This aspect is discussed more fully below. Alternatively, stated, each of the segmented members 90A, 90B, 90C . . . 90J may be covered with a chemical that will permit marking thereof with or without a visible alteration of a marking on the segment with chemical, physical or other means utilized thereon to detect through scanning or otherwise that a particular spacial segmented member has been marked.

Other arrangements may be used on the face 20 of check 10 for coding purposes, so long as some coded designation or means are structured and otherwise provided to accomplish this purpose. Ar. example of one such alternative arrangement is the use of a series of numbers that are to be marked or blocked for purposes of scanning coded impressions, as described. This latter aspect is important to note for purposes of stressing that the inventive concepts herein are not considered to be limited to any particular type of coding means or features or spatial or other symbols to be marked, as long as the maker can place coded symbols or demarcations or alterations on the check 10, whether alphabetic, numeric or otherwise.

In the embodiment shown in the drawings, and as briefly discussed above, a coding system is used that includes or comprises a marked sequence of symbols or segmented members 90A, 90B . . . 90J that are embossed or printed on the front of tne check front face, or somewhere on the check 10, even on the back of the check surface. For this purpose in its most simplistic format, one basic feature of this invention comprises a series of blank blocks optimally numbered from 1 to any arbitrary number, for example 10, as shown. For this purpose, the larger the number of blocks encoded helps increase the number of combinations or permutations for the digital or other code that is used in the particular situation or assigned to a given account holder or maker of the written instrument. Conversely, a smaller number of blocks is addressed in this regard to FIG. 1 of the drawings in which is shown the front face 20 of the negotiable instrument, namely check 10, that incorporates the features of the portrayed embodiment shown. In the embodiment shown in FIG. 1, the front face 20 of check 10 is provided with multiple individualized and separated sectored sections 90A, 90B, 90C . . . 90J on said front face 20. The exact number of such segmented members may vary, however. Each of the segmented members 90A, 90B, 90C . . . 90J is coded or impregnated with a magnetic ink or photosensitive substance or other chemicals that are sensitive in a positive, negative or other manner to an electronic, photoelectric or other sensing means. As stated, these resultant demarcations of the segmented members 90A, 90B, . . . 90J may be detectable to the eye or may not be detectable to the naked eye. In either event, the segmented members are physically adapted for a visible or invisible marking to provide the basic code for authenticating the check when first issued or at later stages. More specifically, the face 20 of check 10 is provided with a series of separated block-like segmented members 90A, 90B . . . 90J that are preferably, but not essentially, aligned in series, as set forth in FIG. 1. Shapes of other than block configurations can be used and other members than isolated spatial areas may be used and numbers or other symbols may be used to be marked in the same manner.

It is to be stressed that the segmented members 90A, 90B . . . 90J can be placed in a number or any position or arrangement in the check face 20. Moreover, the size of the segmented and separate portions may vary and the size of the segmented portions may vary and the shape of the segmented portions may vary from the square arrangement shown in FIG. 1.

The maker of the check will strike over one or more of the segmented members 90A, 90B, . . . 90J, but not all, in order to delineate a predetermined code. For this purpose, the segmented members 90A, 90B . . . 90J, each such marked segmented member will be altered and rendered sensitive to the scanning detection means necessary to ascertain what coded designations are placed in such segmented members and ascertain that the person signing and issuing the check 10 is indeed the authorized person to do so. It is not vital to implementation of the subject invention, as stated above, that the markings made in the segmented members 90A, 90B . . . 90J be invisible to the naked eye when viewed, as the markings or delineations thereon may be visible as long as it is recognized by that the maker of the check there is some attendant risk of marking the spaces prior to execution of the check.

As can be seen from the drawings, check 10, as stated above, has routing numbers 80A for the financial institution on which the check 10 is drawn for payment of the designated amount of funds. For purposes of identification, other than the imprinted name of the financial institution on the check, bank routing numbers 80A emplaced on the check 10 usually have unique numerical designation features imprinted in magnetic ink in order that these numbers can be scanned by electronic means or other means for automatic routing purposes. Additionally, the particular account numbers 80B for the owner of the account, that is the issuer of the check, is set forth on the front face 20 of the check 10, are also deployed thereon generally with the same magnetic printing and unique printed features, said such printing being used for facilitating account identification through scanning or other methodology. Other numerical or letter designations can be placed on the front 20 face of the check 10 for identification routing or other similar purposes.

One of the purposes of this invention is, as stated, to provide some automatic and almost immediate methodology of authenticating the signing and execution of a check when presented at the first instance to a merchant or other initial designated payee or when the check is presented to the financial institution on which the check is drawn. The coding system discussed above serves as the basic component in this authentication process.

In this latter respect, check 10 will have means thereon that, in combination with the above-described coding system, will enable the check to be authenticated, at initial presentation, from a scanning or "reading" of the check itself when initially presented or otherwise. This aspect will also, as stated, help authenticate the proper marking of the check for any older of the check at any stage of presentment thereof, even at the bank stage. More specifically, the check 10 will have means thereon that will in the preferred embodiment, permit a correlation between the account number 80B of check 10 and a code designated as to the owner of a particular checking account, which is manually-placed on the check in the segmented members 90A, 90B, 90C . . . 90J. It must be stressed that the system could utilize other specified numbers or other symbols on the front face 20 of the check 10 for correlation with the coded designations placed in the segmented members 90A, 90B . . . 90J. For example, one could use the routing numbers 80A for the financial institution, or other numbers set forth on the check face 10, as a basis for correlation with the coded designations placed in or on the segmented members 90A, 90B . . . 90J.

Obviously, the manually inserted code designations placed by the check maker will preferably not be the same as any numbered sequence or series of numbers on the front face of the check, but will be related by some coded and confidential differential relationship that will be predetermined between the banking institution on which the check is drawn and the checking account owner. Clearly, it would not be feasible to provide the same coded relationship between any numbers printed on the check 10 and the coded number to be manually-placed on the check in segmented spaces 90A, 90B . . . 90J for all bank customers. If these coded differentials would be the same for all customers, the confidentiality would soon be lost and the process would ultimately become useless as a result.

For purposes of implementing a programmatic correlation between the imprinted checking account numbers 80B on the face 20 of check 10 and the coded designations placed in the segmented members 90A, 90B, 90C . . . 90J, the following programmatic approach set forth as only one potential embodiment, includes the processing and operational steps set forth in the flow chart in FIG. 4. More specifically, as shown schematically in the FIG. 4, the first step 300 in the process involves the step of placing the predetermined code numbers in the segmented members 90A, 90B, . . . 90J on the front face 20 of the check 10. The next step in the process may include the manual step 400 of placing the now coded check 10 in an electronic scanner in the form of a register 450 shown schematically in FIG. 4 of the drawings. Once the coded check 10 is placed in the scanner register 450, it is subjected to an electronic scanning process to read the coded insertions placed in or on the front face 20 of check 10 in segmented members 90A, 90B . . . 90J by the issuer of the check, with this latter step being designated as step 500. The next sequence is the scanning and reading of the bank account numbers 80B on the front face 20 of check 10, or whatever numbers or symbols that are on the face 20 of check 10 used for such purpose, and this step is designated step 600 in FIG. 4. The following steps 700, 750 and 800 involve a comparative reading between the bank account numbers 80B on face 20 of check 10 as compared to the verity coded numbers placed manually on the check front face 20 in segmented members 90A, 90B . . . 90J. This comparative task is schematically set forth in FIG. 4, and will be discussed in more detail below. The final step 500 involves the programmatic decision of rejection or acceptance of the check 10 by receipt of the output of the results of steps 700, 750 and 800, which is the predetermined confidential comparison between the manually coded input data and the bank checking account numbers 80B, or whatever symbols are used.

Vital steps in the foregoing programmatic sequence are the comparative steps 700, 750 and 800. Comparative steps 700, 750, and 800 are adapted, as stated, to compare the manually coded data on face 20 of check 10 with the bank designated account numbers 80B on check 10 or other symbolization thereon. These steps involve the use of manually-placed verity code in or on segmented members 90A, 90B . . . 90J and in the preferred embodiment comparing it with the check account numbers pursuant to mathematical algorithms as set forth in FIG. 4, as incorporated in one or more computer-based programs, or other programs, which may vary in algorithmic approach. or otherwise specifically set forth hereinafter. These programs may vary in approach depending on the type of data that is used for comparative purposes in arriving at the ultimate analysis and results. FIG. 4 incorporates schematically and alphanumerically a preferred mathematical algorithmic approach in steps 700, 750 and 800 for such purposes. This preferred algorithmic approach is not the only approach however that may be used in this regard.

In particular, one preferred programmatic approach uses the manual verity code discussed above, such as a multiple digit number which is entered by maker of the check 10 or negotiable instrument. These numbers are entered on the front face of check 10 preferably in or on segmented members 90A, 90B . . . 90J. With this system, the banking institution assigns a specific and unique verity code number to each owner of each account with such verity code to be manually placed on the check preferably just prior to negotiation thereof. The maker marks the verity code between in or on the segmented members 90A, 90B . . . 90J on the front face 20 of check 10. Such latter segmented members, as stated, are preferably embossed or structured with magnetic materials or other substances to be scanner sensitive to scanner register 450. For this purpose, it is preferable to use a minimum of three digits to fill in the spaces 90A, 90B . . . 90J although additional or less digits may be used. As discussed above, other such code making methods can be utilized for this purpose. In one form, for example, each checking account owner would be given a unique set of three digits, such as 2, 5 and 6. These exemplar numbers will be used in the following discussion to further explain the algorithmic process.

It is noted at this stage, that any reaching device that reads the magnetic bar code enumerations 990 frequently placed along the bottom of check 10 may be used for comparison with the three digit verity code placed on the front face 20 of the check 10. This is one of the several alternate approaches that may be used for comparison, with the encoded verity numbers placed on the check 10, other than using the unique customer account number discussed above or other date on check 10.

In the preferred embodiment, the comparative algorithm is applied to both the verity code and the check account number 80B to determine if the manual code applied by the check maker is the genuine multiple digit code for the account number on the check. As an example of an algorithm in this latter approach, as shown in steps 700, 750 and 800 if FIG. 4, one adds the individual digit verity code numbers to the last three digits of the customer account number digit by digit. The unusual rule of combination takes over if the sum of any two digits is "10" or greater, then the "1" is discarded and not carried forward, as more precisely shown in FIG. 1. Thus, if the account number 80B is 10-80213 using the example of above of a verity code of 2, 5, and 6, the 2 is added to "3" (result 5). The "5" is added to 1 (result 6) and the "6" is added to 2 (result 8). In this example, the final code will then be "568." Other adding variations may be used.

The resultant figure from this addition in the preferred embodiment becomes a unique three digit test number which will indicate a match or not, as stated, for more or less than three digits may be used. There are one thousand possible results of this sum, from 000 to 999. Banking institutions may create each customer's verity code by reversing the secret algorithm to produce the three digit number, which forms the correct test number when added to the customer account number, or may use other comparative methods.

Generically, the program in the one embodiment described can be referred to as the resultant set of integers achieved which will be a function described as $(R)=(Z+Y)+(X+W)+(V+U) \ldots =(a')(b')(c') \ldots$ where a' b' c' . . . are simply juxtaposed integers described collectively as "R" and "Z+Y"=a' and "X+W}=b' and "V+U"=c' and so forth, the exact number of integers varying more or less than three, as desired. In this functional relationship "Z" equals the first digit of the assigned verity code, while "Y" is the last digit in the numbers comprising bank account number 80B (if the bank account number is used as the basis for comparison). Similarly, in this relationship "X" is the second digit of the assigned verity code and "W" is the second from last number in the bank account number 80B, and further "V" is the third number of the verity code and "U" is the third number from the end of the bank account number 80B. By this functional relationship the end result in the preferred embodiment will yield a three number series a', b' c' that are not added but merely juxtaposed for identification purposes as a multi-digit code.

As stated, more or less than the three numbers may be used in this process. The three digit test results in 99.7% assurance that the maker of the check has the genuine verity code.

The programmatic approach can be more generally described as using in conjunction with any set of numbers on the front face of the check 10 would be: "R" (R) is the resultant unadded sequence of integers or numbers a', b', c', d', e'f' . . . such latter numbers being respectively and individually the separate product of $(Z+Y)+(X+W)+(V+U)+ \ldots$ where Z is the first of the verity coded numbers and Y is the last number of the numbers of any numbered sequence on the check, and X is the second of the verity code numbers and W is the second from last of the numbered sequence used on the check and V is the third of the verity code numbers and U is the third from last of the numbered sequence used on the check, and where the exact number of digits comprising the unadded sequence R (for the ultimate code) may vary from 1 up to any higher number using the foregoing algorithmic sequential approach. The resultant number of individual integers will be the product of such sequential adding methods, as stated and dependent upon the number of integers used in the verity code.

It should be noted that any system may use a system of addition, subtraction, division, multiplication or other mathematical or other manipulation relative to and between respective integers on the verity code and the numbered sequence and it is not essential that the numbers compared use an addition, subtraction, multiplication or division or similar method. It is also not necessary that the numbers compared by in a direct lineal sequence or series sequence but may involve alternate integers or spaced integers, or other integer selection in the verity code or alternate spaced or varying selection for the integers or numbers in the account numbers. Any sequenced integer in the account number of whatever set of numbers may be used, and can be matched or mathematically mated with any arbitrary sequenced integer in the verity code or any sequenced number in the pre-printed comparison numbers.

Thus, in the steps 700, 750 and 800 used to compare the verity code with any of the symbols, numerology, or other demarcations on the front face 20 or back face 25 of the check 10, some mathematical, logical, algorithmic or other means may be utilized to correlate the verity code designations with the selected symbolization on the front face or back face of the check 10. Any such process may be used as long as the end result is a coded final verification symbolization, whether such verification be numerically oriented, alphabetically oriented, or otherwise symbolically oriented to provide a final verification code. Thus, in this respect, the above designated preferred correlation described above is only one of many variations and embodiments that may be used in the overall verfication process.

It is to be noted at this juncture that the correlation process may be other than computer oriented and may be used without a scanning device, such as scanning register. In effect, such correlation procedure may be accomplished by any means that achieves a final verification code between the symbols placed on the font face 20 of the check 10, or on the back face, in conjunction with other symbols placed on the front or back face of the check.

In conjunction with the foregoing correlation coding procedures, a master computer program 1000 is prepared by the banking institution upon which the checks are written. This master program, as an element in this procedure, is preferably available and utilized in the scanner register 450. This master program 1000 is structured to provide a final coded symbolization, such as the series of numerical integers, as stated above, as tied to a given symbolization on the check 10, such as the specific checking account number. Further the master program will comprise, in part, a unique coded designation number for any bank customer, or at least minimal commonality of such coded member. This program 1000 is simply and directly deployed and available to the scanning register 450, as would be any similar computer program for other banking institutions. Thus, the computer programs, such as program 1000, will yield a data base of final coded designations for specified banking accounts, and a final step in the process involves a comparative step between the final verity code realized from steps 700, 750 and 800 of the initial correlation process and the data stored in the computer program 1000. This correlation provides the final rejection or acceptance decision step 1200, as seen schematically in FIG. 4 of the drawings.

In summary, the subject invention is a method of authenticating the making of a negotiable instrument by a maker having a front face 20 and a back face 25 instrument when the negotiable instrument is presented to a payee for payment for the maker of a negotiable instrument comprising the following steps:

(A) emplacing a numeral identification number on the front of the negotiable instrument;

(B) emplacing marking means on the front face of the negotiable instrument that can be marked by the presenter of necotiable instruments when presented to incorporate coded symbols identified with the maker of the negotiable instrument;

(C) comparing the numeral identification number with the coded marking symbols emplaced on the front face of such negotiable instrument using the comparative computer programming steps.

A further summary of the subject invention is described as a method of authenticating the execution of a negotiable instrument by the maker of a negotiable instrument having a front face and a back face instrument when the negotiable instrument is presented to a payee for payment to the maker of the negotiable instrument comprising the following steps:

(A) emplacing a numeral identification number on the front of the negotiable instrument;

(B) emplacing marking means on the front face of the negotiable instrument that can be marked by the presenter of negotiable instruments when presented to incorporate coded symbols identified with the maker of the negotiable instrument;

(C) comparing the numeral identification number with the coded marking symbols emplaced on the front face of such negotiable instrument.

Yet another summary of the subject invention is described as a method of authenticating the making by a specific maker of a negotiable instrument drawn on a given financial institution, having a front face and a back face, when the negotiable instrument is presented to a payee for payment by the maker of a negotiable instrument comprising the preliminary steps of (A) emplacing a numeral identification number on the front face of the negotiable instrument, such identification number being structured to be electronically scanned, and (B) emplacing marking means on the front face of the negotiable instrument that can be marked by the maker of negotiable instruments when presented for negotiation to incorporate coded symbols identified with the specific maker of the negotiable instrument, such marking means being structured to be electronically scanned; and (C) comparing the numeral identification number with the coded marking symbols emplaced on the front face of such negotiable instrument using the following programmatic steps:

(1) comparing preprinted coded symbols to the manually placed symbols on the check, by using, in turn, the following algorithmic procedures:

(a) read the verification coded symbols manually placed on the front face of the negotiable instrument through scanning means;

(b) read the predetermined coded symbols printed on the front face of the negotiable instrument through scanning means;

(c) utilizing correlation means between the verification coded symbols and the predetermined symbols printed on the front face of the negotiable instruments, such correlation means being alphanumeric based to arrive at a coded correlation symbolization;

(d) comparing the coded symbolization derived from the correlation means with known coded information for a given negotiable instrument with said financial institution;

(e) rendering a rejection or acceptance of such negotiable instrument based on the step of the coded symbolization on the negotiable instrument with the known coded symbolization.

What is claimed is:

1. A method of authenticating the execution of a negotiable instrument by the maker of a negotiable instrument having a front face and a back face when the negotiable instrument is presented to a payee for payment to the maker of the negotiable instrument comprising:

(a) emplacing a numeral identification number of the front of the negotiable instrument;

(b) emplacing marking means on the front face of the negotiable instrument that can be marked by the maker of the negotiable instrument when presented, to incorporate coded symbols identified with the maker of the negotiable instrument;

(c) comparing the numeral identification number with the coded marking symbols emplaced on the front face of such negotiable instrument, according to the following mathematical relationship using in conjunction with any set of numbers on the front face of the check 10 would be: "R" (R) is the resultant unadded sequence of integers or numbers a', b', c', d', e', f' . . . such latter numbers being respectively and individually the separate product of (Z+Y)+(X+W)+(V+U)+ . . . where Z is the first of the verity coded numbers and Y is the last number of the numbers of any numbered sequence on the check, and X is the second of the verity code numbers and W is the second from last of the numbered sequence used on the check and V is the third of the verity code numbers and U is the third from last of the numbered sequence used on the check, and where the exact number of digits comprising the unadded sequence R for the code may vary from 1 up to any higher number using the foregoing algorithmic sequential approach.

2. A method of authenticating the making by a specific maker of a negotiable instrument drawn on a given financial institution, having a front face and a back face, when the negotiable instrument is presented to a payee for payment by the maker of a negotiable instrument comprising the steps of:

(A) emplacing a numeral identification number on the front face of the negotiable instrument, and (B) emplacing marking means on the front face of the negotiable instrument that can be marked by the maker of negotiable instruments when presented for negotiation to incorporate coded symbols identified with the specific maker of the negotiable instrument; and (C) comparing the numeral identification number with the coded marking symbols emplaced on the front face of such negotiable instrument using the following computer programming steps:

(1) comparing preprinted coded symbols to the manually placed symbols on the check, by using, in turn, the following algonithmic procedures:

(a) read the verification coded symbols manually placed on the front face of the negotiable instrument through scanning means;

(b) read the predetermined coded symbols printed on the front face of the negotiable instrument through scanning means;

(c) utilizing correlation means between the verification coded symbols and the predetermined symbols printed on the front face of the negotiable instruments, such correlation means being alphanumeric based to arrive at a coded correlation symbolization utilizing the following algorithmic formulation having the resultant set of integers achieved which will be a function described as (R)=(Z+Y)+(X+W)+(V+U) . . . =(a') (b') (c') . . . where a' b' c' . . . are simply juxtaposed integers described collectively as "R" and "Z+Y"=a' and "X+W"=b' and "V+U"=c' and so forth, the exalt number of integers varying more or less than three, in which functional relationship "Z" equals the first digit of the assigned verity code, which "Y" is the last digit in the numbers comprising bank account number of the check and where "X" is the second digit of the assigned verity code and "W" is the second from last number in said bank account, and further "V" is the third number of the verity code and "U" is the third number from the end of the bank account, in which functional relationship the end result yields a multiple number series a', b' c' . . . z' of any number of resultant digits that are not added but reviewed for identification purposes as a multidigit code.

(d) comparing the coded symbolization derived from the correlation means with known coded information for a given negotiable instrument with said financial institution.

(e) rendering a rejection or acceptance of such negotiable instrument based on the step of the coded symbolization on the negotiable instrument with the known coded symbolization.

3. A method of authenticating the making or presentment by a specific maker or presenter of a negotiable instrument drawn on a given institution, said instrument having a front face and a back face, when the negotiable instrument is presented to another for payment by the maker of a negotiable instrument comprising the steps of:

(a) printing a numeric identification on the front face of the negotiable instrument, and, (b) emplacing marking means on the front face of the negotiable instrument that can be marked in coded sequence by the maker of negotiable instruments when presented for negotiation to incorporate marked coded symbols on said marking means as identified with the specific maker or presenter of the negotiable instrument; and, (c) comparing the meric identification with said marked coded symbols emplaced on the front face of such negotiable instrument using the following steps:

(1) comparing said numeric identification on said front face of said instrument to the marked coded symbols on front face of said instrument, by using, in turn, the following algorithmic procedures:

(a) read the marked coded symbols marked by the presenter or maker on marking means on the front face of the negotiable instrument through scanning means;

(b) read said numeric identification printed on the front face of the negotiable instrument through scanning means;

(c) utilizing correlation means between the marked coded symbols and the numeric identification printed on the front face of the negotiable instruments, such correlation means being alphanumeric means based to arrive at a coded correlation between the printed numeric identification, utilizing the following algorithmic formulation having the resultant set of integers accumulated which will be a function described as (R)=(Z+Y)+(X+W)+(V+U) . . . =(a') (b') (c') . . . where a' b' c' . . . are simply juxtaposed integers described collectively as "R" and "Z+Y"÷ a' and "X+W"= b' and "V+U"=c' and so forth, the exact number of integers varying more or less than three, in which functional relationship "Z" equals the first digit of the assigned marked code symbol where "Y" is one of the digits in the numbers comprising printed identification number of the negotiable instrument and where "X" is the second digit of the assigned marked code symbol and "W" is yet another of the digits of printed identification number on said negotiable instrument, and further "V" is the third digit of the assigned marked coded symbol and "U" is still another number of printed identification number of said negotiable instrument, in which resultant set of integers accumulates in the end result yields a multiple number series a', b', c' . . . z' of any number of resultant digits added from respective digits of printed identification number on said negotiable instrument and the added respective digits from the assigned marked coded symbols on said negotiable instrument are individually added and reviewed for identification purposes as a multi-digit code.

(d) comparing the coded symbolization derived from said correlation means with known coded information for a given negotiable instrument with said financial institution.

* * * * *